US012795476B2

(12) United States Patent
Li et al.

(10) Patent No.: US 12,795,476 B2
(45) Date of Patent: Nov. 10, 2026

(54) INTER-CELL BASED L1-RSRP MEASUREMENT AND REPORTING FOR FR2

(71) Applicant: Intel Products IP LLC, Santa Clara, CA (US)

(72) Inventors: Hua Li, Arlington, VA (US); Meng Zhang, Beijing (CN); Andrey Chervyakov, Nizhny Novgorod (RU); Rui Huang, Beijing (CN); Ilya Bolotin, Nizhny-Novgorod (RU)

(73) Assignee: Intel Products IP LLC, Santa Clara, CA (US)

( * ) Notice: Subject to any disclaimer, the term of this patent is extended or adjusted under 35 U.S.C. 154(b) by 44 days.

(21) Appl. No.: 18/288,518

(22) PCT Filed: Aug. 4, 2022

(86) PCT No.: PCT/US2022/039370
§ 371 (c)(1),
(2) Date: Oct. 26, 2023

(87) PCT Pub. No.: WO2023/014852
PCT Pub. Date: Feb. 9, 2023

(65) Prior Publication Data

US 2024/0214888 A1 Jun. 27, 2024

Related U.S. Application Data

(60) Provisional application No. 63/297,637, filed on Jan. 7, 2022, provisional application No. 63/270,480, filed (Continued)

(51) Int. Cl.
*H04W 36/00* (2009.01)
*H04B 17/318* (2015.01)
*H04W 36/08* (2009.01)

(52) U.S. Cl.
CPC ...... *H04W 36/0085* (2018.08); *H04B 17/328* (2023.05); *H04W 36/085* (2023.05)

(58) Field of Classification Search
CPC ........... H04W 36/0085; H04W 36/085; H04W 36/00; H04W 24/08; H04W 24/10;
(Continued)

(56) References Cited

U.S. PATENT DOCUMENTS

2019/0306675 A1* 10/2019 Xue ........................ H04W 4/40
2020/0252997 A1* 8/2020 Sirotkin ................ H04W 88/10
(Continued)

FOREIGN PATENT DOCUMENTS

WO WO-2023014852 A1 2/2023

OTHER PUBLICATIONS

"3GPP; TSG RAN; NR; Requirements for support of radio resource management (Release 17)", 3GPP TS 38.133 V17.2.0, (Jul. 9, 2021).
(Continued)

*Primary Examiner* — Afshawn M Towfighi
(74) *Attorney, Agent, or Firm* — Schwegman Lundberg & Woessner, P.A.

(57) ABSTRACT

An apparatus and system for a receive (RX) beam assumption, and inter-cell radio beam measurements and resource management (RRM) requirements are described. In response to a determination whether or not a frequency range2 (FR2) signal from a neighbor cell is to be measured inside a Synchronization System (SS) ZPhysical Broadcast Channel (PBCH) Block Measurement Timing Configuration (SMTC) window, a first RX beam from the neighbor cell for a Layer 1 Reference Signal Received Power (L1-RSRP) measurement of the FR2 signal and a second RX beam for a Layer 3 RSRP (L3-RSRP) measurement of the FR2 signal are selected. A L1-RSRP of the FR2 signal for the first RX
(Continued)

beam and L3-RSRP of the FR2 signal for the second RX beam are measured and feedback provided to a serving cell.

9 Claims, 5 Drawing Sheets

Related U.S. Application Data on Oct. 21, 2021, provisional application No. 63/230,470, filed on Aug. 6, 2021.

(58) Field of Classification Search
CPC . H04W 56/001; H04B 17/328; H04B 7/0632; H04B 17/327; H04B 7/06952
See application file for complete search history.

(56) References Cited

U.S. PATENT DOCUMENTS

| | | | | |
|---|---|---|---|---|
| 2021/0111851 | A1 | 4/2021 | Lin | |
| 2021/0195453 | A1* | 6/2021 | Zhang | H04B 7/022 |
| 2021/0195651 | A1* | 6/2021 | Zhang | H04W 24/10 |
| 2021/0212091 | A1* | 7/2021 | Pezeshki | H04W 72/54 |
| 2021/0368572 | A1* | 11/2021 | Lim | H04W 76/16 |
| 2023/0171629 | A1* | 6/2023 | Cui | H04L 5/0094<br>370/252 |

OTHER PUBLICATIONS

"International Application Serial No. PCT/US2022/039370, International Search Report mailed Nov. 22, 2022", 4 pgs.
"International Application Serial No. PCT/US2022/039370, Written Opinion mailed Nov. 22, 2022", 6 pgs.
Huawei, et al., "Discussion on RRM impacts for R17 NR FeMIMO", R4-2110305, 3GPP TSG-RAN WG4 Meeting #99-e, Electronic Meeting, (May 11, 2021), 17 pgs.
Vivo, "Further discussion on multi beam enhancement", R1-2104343, 3GPP TSG RAN WG1 #105-e, e-Meeting, (May 11, 2021), 40 pgs.
"International Application Serial No. PCT/US2022/039370, International Preliminary Report on Patentability mailed Feb. 15, 2024", 8 pgs.

* cited by examiner

INTER-CELL BASED L1-RSRP MEASUREMENT AND REPORTING FOR FR2

PRIORITY CLAIM

This application is a U.S. National Stage Filing under 35 U.S.C. 371 from International Application No. PCT/US2022/039370, filed Aug. 4, 2022 and published in English as WO 2023/014852 on Feb. 9, 2023, which claims the benefit of priority to U.S. Provisional Patent Application Ser. No. 63/230,470, filed Aug. 6, 2021, U.S. Provisional Patent Application Ser. No. 63/270,480, filed Oct. 21, 2021, U.S. Provisional Patent Application Ser. No. 63/297,637, filed Jan. 7, 2022, each of which is incorporated herein by reference in its entirety.

TECHNICAL FIELD

Embodiments pertain to next generation (NG) wireless communications. In particular, some embodiments relate to radio resource management (RRM) requirements for inter cell beam management.

BACKGROUND

The use and complexity of next generation (NG) or new radio (NR) wireless systems, which include 5G networks and are starting to include sixth generation (6G) networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology, including complexities related to multiple input multiple output (MIMO) communications.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
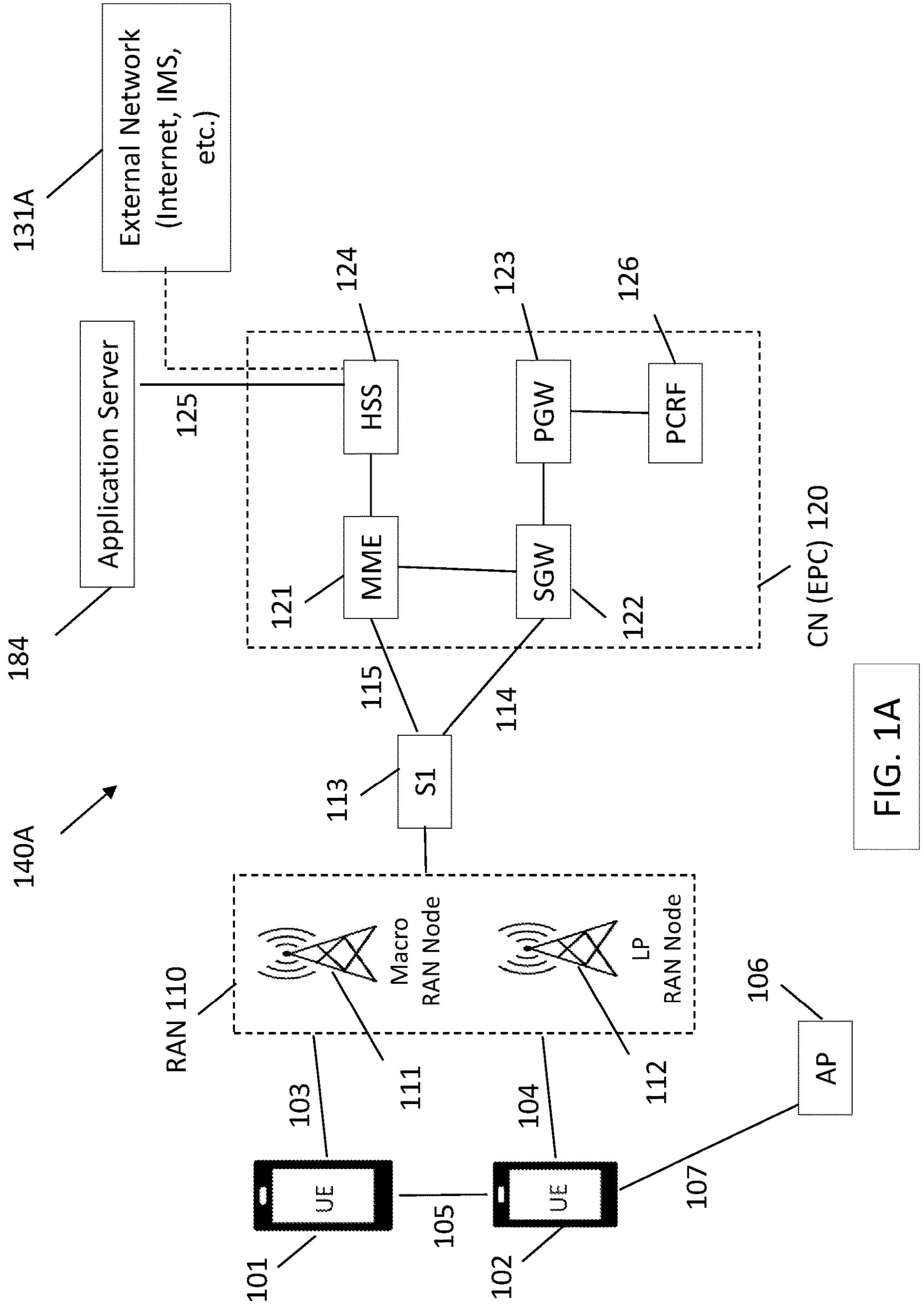
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G and later generation functions. Accordingly, although 5G will be referred to, it is to be understood that this is to extend as able to 6G (and later) structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHZ, 3.6-3.8 GHZ, and other frequencies and Spectrum Access System (SAS) in 3.55-3.7 GHZ and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The RAN 110 may contain one or more gNBs, one or more of which may be implemented by multiple units. Note that although gNBs may be referred to herein, the same aspects may apply to other generation NodeBs, such as $6^{th}$ generation NodeBs—and thus may be alternately referred to as Radio Access Network node (RANnode).

Each of the gNBs may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB may be distributed in different units—a Central Unit (CU), at least one Distributed Unit (DU), and a Remote Radio Head (RRH). The CU may provide functionalities such as the control the transfer of user data, and effect mobility control, radio access network sharing, positioning, and session management, except those functions allocated exclusively to the DU.

The higher protocol layers (PDCP and RRC for the control plane/PDCP and SDAP for the user plane) may be implemented in the CU, and the RLC and MAC layers may be implemented in the DU. The PHY layer may be split, with the higher PHY layer also implemented in the DU, while the lower PHY layer is implemented in the RRH. The CU, DU and RRH may be implemented by different manufacturers, but may nevertheless be connected by the appropriate interfaces therebetween. The CU may be connected with multiple DUs.

The interfaces within the gNB include the E1 and front-haul (F) F1 interface. The E1 interface may be between a CU control plane (gNB-CU-CP) and the CU user plane (gNB-CU-UP) and thus may support the exchange of signaling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using a non UE-associated signaling connection and UE-associated services that are related to a single UE and are associated with a UE-associated signaling connection that is maintained for the UE.

The F1 interface may be disposed between the CU and the DU. The CU may control the operation of the DU over the F1 interface. As the signaling in the gNB is split into control plane and user plane signaling, the F1 interface may be split into the F1-C interface for control plane signaling between the gNB-DU and the gNB-CU-CP, and the F1-U interface for user plane signaling between the gNB-DU and the gNB-CU-UP, which support control plane and user plane separation. The F1 interface may separate the Radio Network and Transport Network Layers and enable exchange of UE associated information and non-UE associated information. In addition, an F2 interface may be between the lower and upper parts of the NR PHY layer. The F2 interface may also be separated into F2-C and F2-U interfaces based on control plane and user plane functionalities.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VOIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a core network (CN) 120. The NG-RAN 110 can include a plurality of nodes, such as gNBs and NG-eNBs. The CN 120 (e.g., a 5G core network (5GC)) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
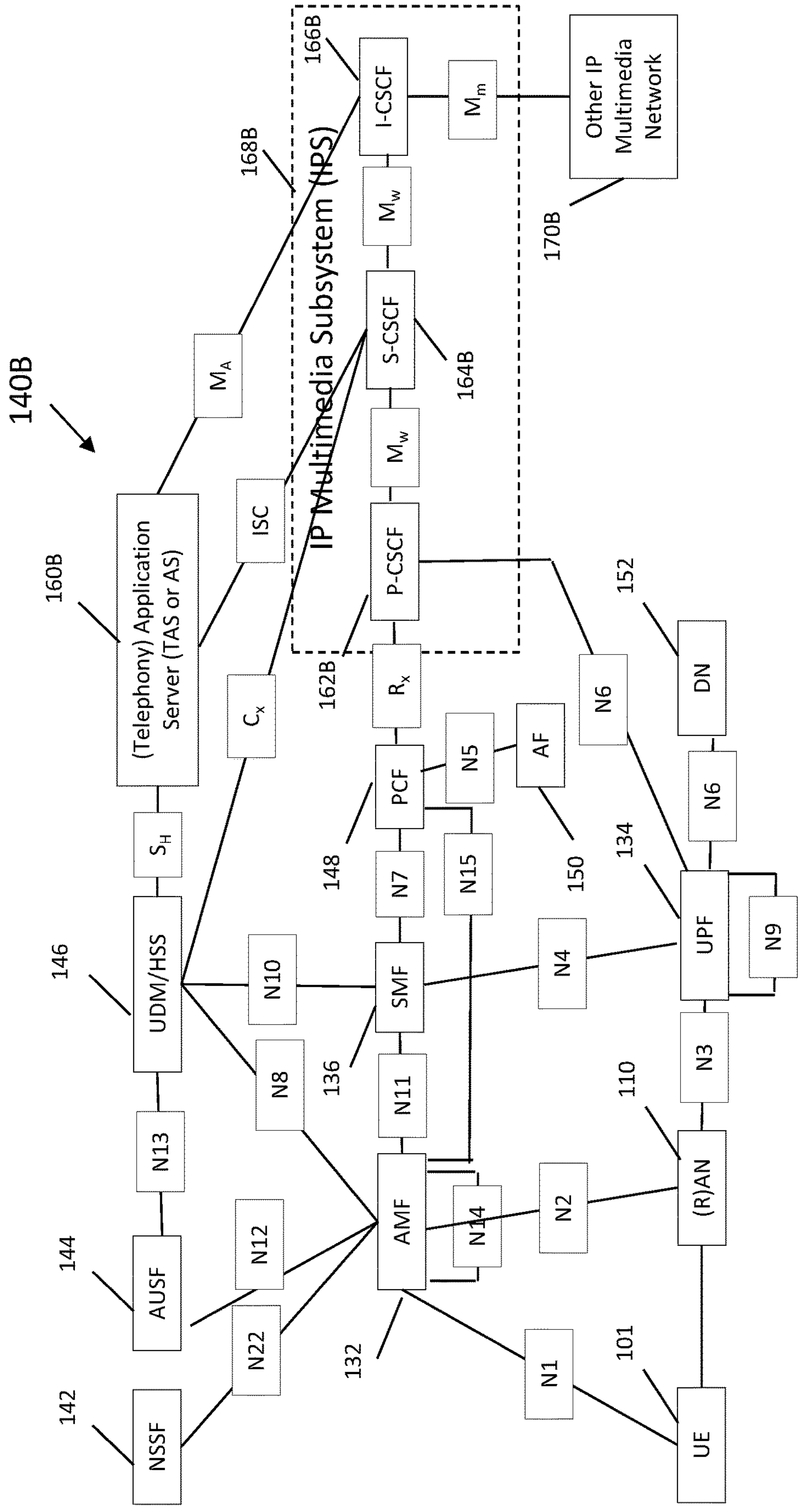
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other CN network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170B, e.g. an IMS operated by a different network operator.

In some aspects, the UDM/HSS 146 can be coupled to an application server (AS) 160B, which can include a telephony application server (TAS) or another application server. The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
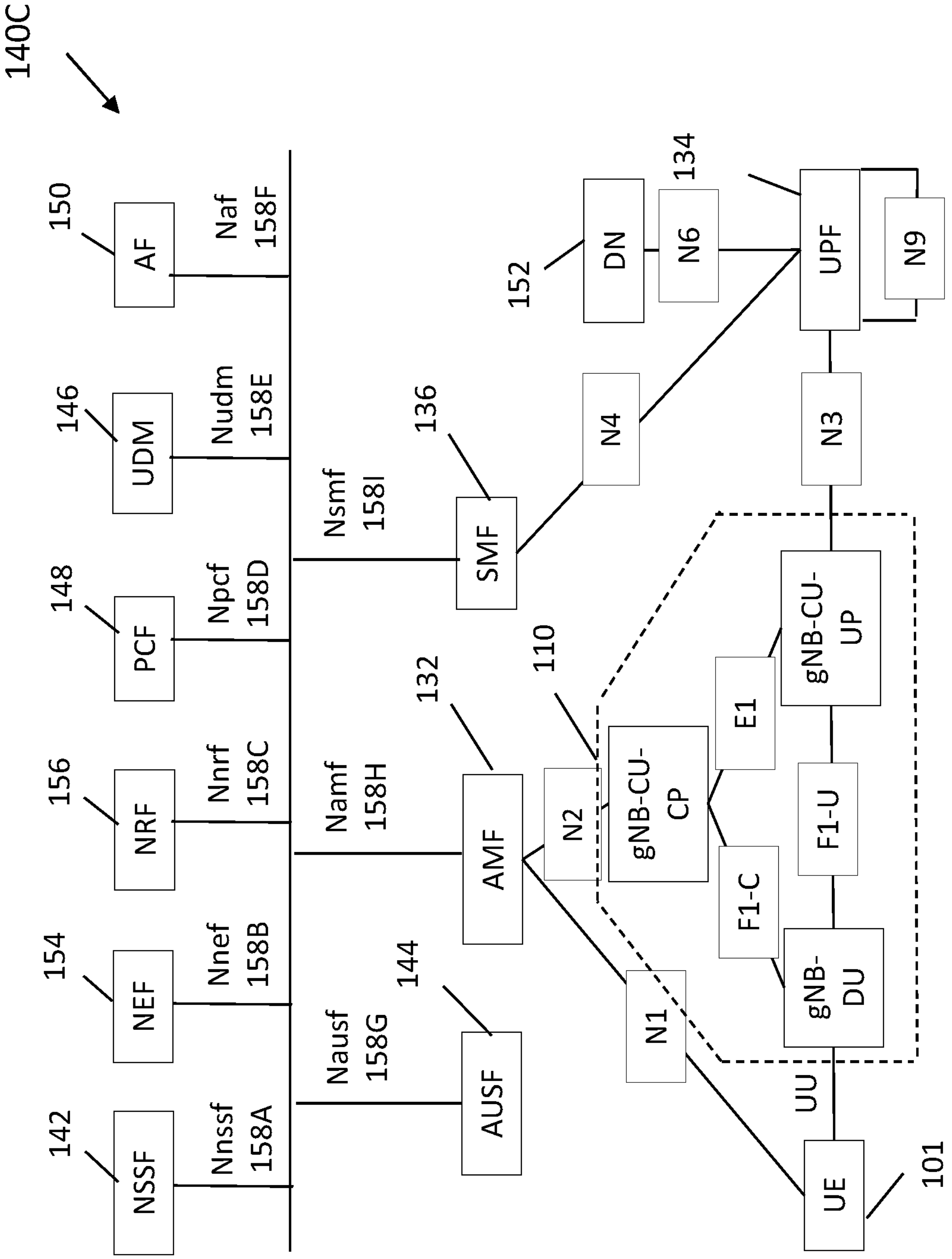
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5G-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
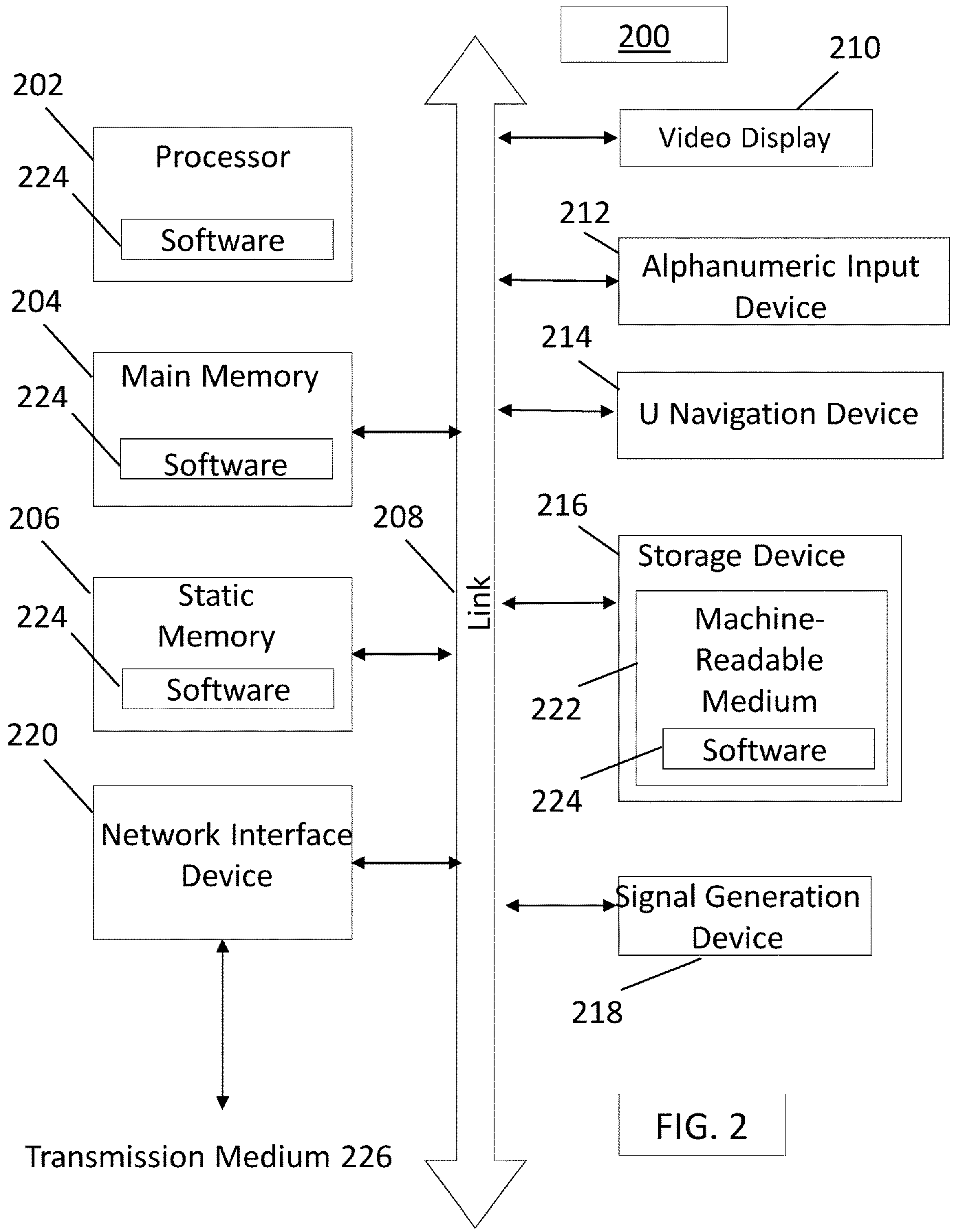
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, “car radio phone”), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHZ), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHZ)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHZ, 3.6-3.8 GHz and further frequencies and SAS=Spectrum Access System/CBRS=Citizen Broadband Radio System in 3.55-3.7 GHZ and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHZ, 1710-2025 MHz, 2110-2200 MHz, 2300-2400 MHZ, 2.4-2.4835 GHz (note: it is an ISM band with global availability and it is used by Wi-Fi technology family (11b/g/n/ax) and also by Bluetooth), 2500-2690 MHz, 698-790 MHZ, 610-790 MHz, 3400-3600 MHZ, 3400-3800 MHZ, 3800-4200 MHz, 3.55-3.7 GHZ (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHZ, 3800-4200 MHZ, 3.5 GHz bands, 700 MHz bands, bands within the 24.25-86 GHz range, etc.), spectrum made available under FCC's “Spectrum Frontier” 5G initiative (including 27.5-28.35 GHZ, 29.1-29.25 GHZ, 31-31.3 GHZ, 37-38.6 GHZ, 38.6-40 GHz, 42-42.5 GHZ, 57-64 GHz, 71-76 GHZ, 81-86 GHz and 92-94 GHZ, etc), the ITS (Intelligent Transport Systems) band of 5.9 GHZ (typically 5.85-5.925 GHZ) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHZ) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHZ, and future bands including 94-300 GHz and above. Furthermore, the scheme can be used on a secondary basis on bands such as the TV White Space bands (typically below 790 MHz)

where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., lowithmedium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

5G networks extend beyond the traditional mobile broadband services to provide various new services such as internet of things (IoT), industrial control, autonomous driving, mission critical communications, etc. that may have ultra-low latency, ultra-high reliability, and high data capacity requirements due to safety and performance concerns. Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

Figure 3:
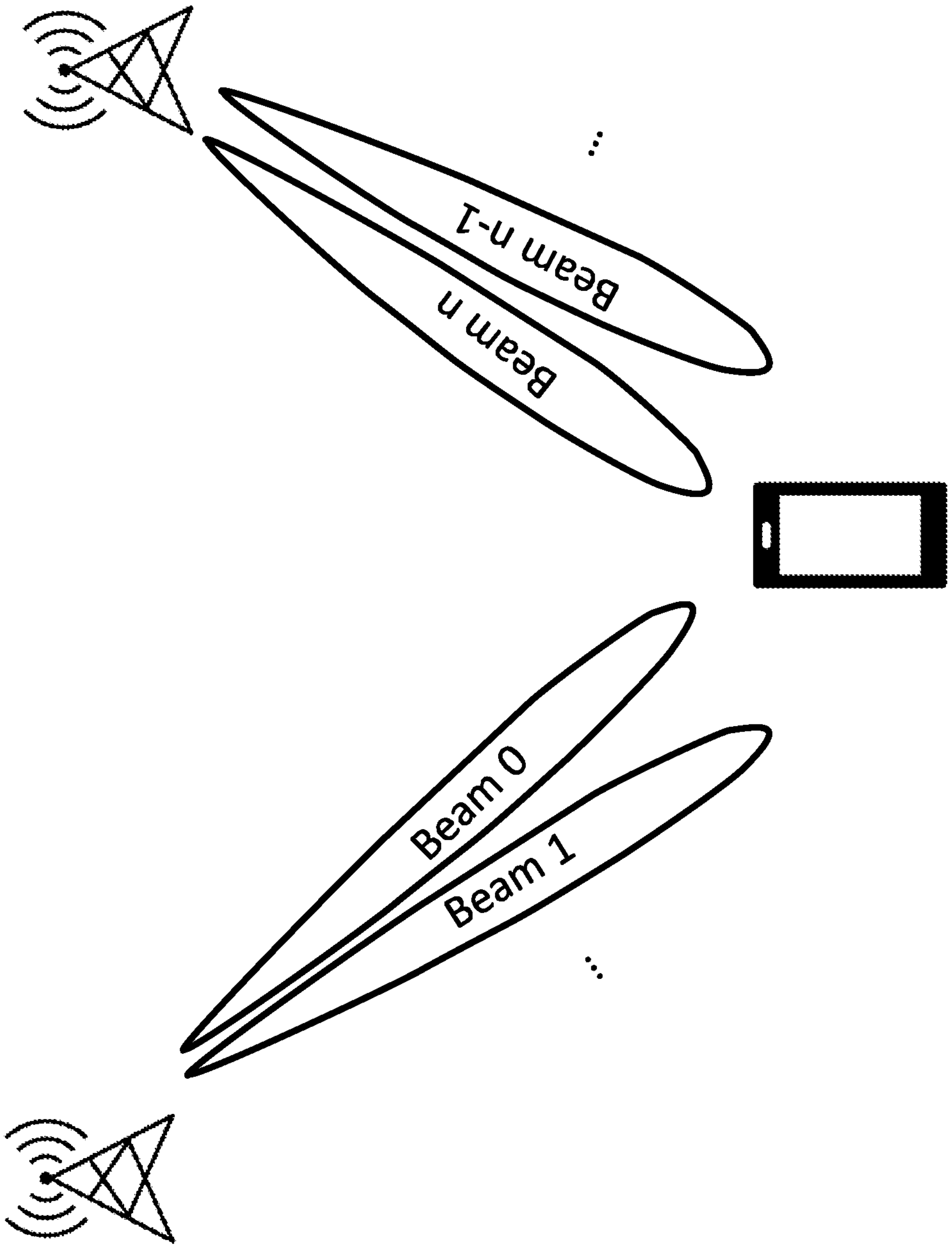
FIG. 3 illustrates inter-cell beam measurement in accordance with some embodiments.

As above, with the advent of enhanced UE architectures, the use of MIMO communications, e.g., between the UE and gNB and between UEs, has become increasingly prevalent. This has led to further enhancements in MIMO (FeMIMO) to management of beamforming and beamsteering and reduce associated overheads. To this end, FeMIMO aims to extend 3GPP specification support in the following areas targeting frequency range2 (FR2) (24.25 GHz to 52.6 GHz) and FR1 (4.1 GHz to 7.125 GHZ): multi-beam operation, support for multi-transmission/reception point (TRP) deployment, sounding reference signal (SRS), and channel state information (CSI) measurement and reporting. Among the objectives, RAN4 will focus on multiple issues, including a unified TCI framework for downlink (DL) and uplink (UL) transmissions, layer1/layer2 (L1/L2)-centric inter-cell mobility, and beam indication signaling medium. Measurement by the UE of beams from multiple cells (serving and secondary) is useful for mobility purposes, among others. FIG. 3 illustrates inter-cell beam measurement in accordance with some embodiments. As shown, each cell, whether serving or neighbor, transmits a downlink (DL) reference signal (RS) to the UE using different beams, which is measured by the UE and feedback transmitted to the cell to indicate the best beam to use for communication with the UE. The feedback may be, for example, use of a specific physical random access channel (PRACH) resource mapped to each beam to provide characteristics such as the Layer 1 reference signal received power (L1-RSRP) of the beam.

RSRP measurement is thus performed and reported at Layer 1 (Physical Layer) and Layer 3 (RRC Layer); the UE can provide Synchronization System (SS) RSRP (SS-RSRP) measurements at Layer 1 when sending Channel State Information (CSI) and at Layer 3 when sending an RRC Measurement Report to the gNB. To generate SS-RSRP measurement results, the UE measures a PBCH-demodulation reference signal (DMRS) signal. The DMRS and SS signals may be transmitted with equal power to permit the results to be averaged. While performing L1 SS-RSRP measurements, the UE may also measure CSI-RS. The CSI-RS may be transmitted with a different power than the SS and PBCH-DMRS, in which case the power offset information is provided to the UE to take the offset into account during the CSI-RS measurement.

L1 measurements are used for beam level procedures for rapid reaction. Such procedures may include, e.g., beam management procedures that allow the UE to rapidly switch between beams. L3 measurements may be used for either beam or cell level procedures. L3 measurements are used for RRM procedures that look at channel conditions over an extended time period. Such RRM procedures include handover procedures triggered after L3 filtering to reduce the risk of ping-pong switching between serving cells.

A number of issues still abound, however. For inter-cell beam measurement, the receiver (RX) beam assumption (the RX beam received by the UE) is not defined but has an impact on the measurement delay requirement. The interruption and beam switching time is specified in 3GPP TS 38.133.

In legacy L1-RSRP measurements for a serving cell, the RX beam is assumed to be different for the L1 serving cell and L3 neighbor cells measurements. This means that the L1-RSRP measurement for the serving cell is performed outside the Synchronization System (SS)/Physical Broadcast Channel (PBCH) Block Measurement Timing Configuration (SMTC) window (referred to as outside SMTC). For the L1-RSRP measurement for a neighbor cell, the RX beam is different from the L1-RSRP measurement of the serving cell. However, one question that remains is whether the RX beam for an L1 measurement and L3 measurement of neighbor cells can be the same.

To this end, first an L3 measurement performed to find a suitable cell. Further evaluation of the beam quality for the identified neighbor cell is then performed. An L1-RSRP measurement of a neighbor cell beam measurement is performed after the L3 neighbor cell measurement. Since the L1-RSRP measurement is performed for a specific cell, it may be possible to find a better RX beam to calculate a more accurate beam quality for the specific cell. Thus, the RX beam used for the L1-RSRP measurement of a neighbor cell may be different from that of the L3 measurement. The L1-RSRP measurement may use Synchronization Signaling Blocks (SSBs) outside the SMTC to find the best RX beam. If the SSB outside the SMTC is used, a shorter measurement delay may occur for inter-cell L1-RSRP measurements, which is desirable for a quick response to beam measurement. In addition, the SMTC periodicity may be much larger than that of the SSB. If the UE performs an inter-cell L1-RSRP measurement outside the SMTC, the UE may be able to provide feedback indicating the result more quickly. However, the SSB for the inter-cell L1-RSRP measurement may be shared with the SSB for L1-RSRP/Radio Link Monitoring (RLM)/Bidirectional Forwarding Detection (BFD) of the serving cell, the measurement delay for the serving cell may be extended.

For FR2, if different RX beams are assumed for the L1 and L3 measurement of a neighbor cell, a more accurate beam quality measurement can be achieved, and a shorter measurement delay is expected for inter-cell measurements. However, the measurement delay for L1 measurements of the serving cell may be impacted and extended.

If a L1-RSRP measurement of a neighbor cell is performed in the same SMTC with that of an L3 measurement and no L3 measurement is impacted, the L1-RSRP measurement uses only the same beam as the L3 measurement. This means that the UE may not find a more suitable RX beam to calculate the beam quality, and consequently the L1-RSRP measurement may not be relatively accurate. In addition, as the SMTC periodicity is longer than that of the SSB, the measurement delay for the L1-RSRP measurement of a neighbor cell is extended. Thus, in this case, the measurement period for the L1 serving cell measurement is not delayed.

For FR2, if the same RX beam is assumed for the L1 and L3 measurement of a neighbor cell, the L1 serving cell measurement is not delayed. However, the beam quality measurement may not be accurate, and the measurement delay may be longer for inter-cell measurements.

In this case, a tradeoff may exist between performance loss and measurement delay and complexity. Thus, a balanced method for the RX beam assumption may then be used, i.e., SSB is used both inside and outside the SMTC window.

The L1-RSRP measurement of an inter-cell beam measurement is performed after an L3 neighbor cell measurement since L3 measurement may be used to initially find the proper cell. When performing the L3 measurement, the UE can still attain some initial RX beam sweeping result for the cell even if the RX beam is not particularly accurate. The following L1-RSRP measurement then can be performed outside SMTC. In this case, different RX beams can be assumed for the L1 and L3 measurements. The UE can then find the best beam outside SMTC using fewer samples. Note that while in legacy systems, N=8 is defined for RX beam sweeping, a smaller number may be able to be defined for the RX beam sweeping factor (e.g., N=3 or 4) in NG systems. The reduced RX beam sweeping factor may reduce the impact to legacy RLM/L1-RSRP/BFD serving cell measurements.

Therefore, SSBs both inside and outside SMTC can be used for L1-RSRP measurements for a neighbor cell. This allows the RX beam sweeping factor to be further reduced. If the L1-RSRP measurement for the neighbor cell is performed inside SMTC, the same RX beam of the L3 measurement is used. If the L1-RSRP measurement of the neighbor cell is performed outside SMTC, a different RX beam can be used.

In some cases, performing L1-RSRP measurements for inter-cell measurements may conflict with the SSB used for a serving cell measurement. In legacy requirements, the P factor is used when the SSB for the serving cell measurement (RLM/BFD/L1-RSRP) overlaps with SMTC and Gap. Therefore, a sharing factor may be used if such a conflict happens. The sharing factor, X, may be introduced on top of the P factor, i.e., X*P.

For FR1, since there is one common RX beam for both the serving cell and non-serving cell, the inter-cell beam measurement can be performed both inside SMTC or outside SMTC. In some cases, measurements may only be performed inside SMTC to reduce the scheduling complexity.

RRM Related Requirement for Inter-Cell Mobility

Note that an SSB based inter-cell measurement is performed for handover decisions in inter-cell mobility.

As above, certain enhancement on multi-beam operation mainly target FR2 signals due to the channel difficulties, but may still be applicable to FR1 signals. It would be desirable to identify and specify features to facilitate more efficient (lower latency and overhead) DL/UL beam management for intra-cell and inter-cell scenarios to support higher UE speed and/or a larger number of configured TCI states. In some cases, a common beam may be used for DL and UL data and control transmission/reception, especially for intra-band carrier aggregation (CA). A unified TCI framework for DL and UL beam indication may also be used, in addition to enhancement on signaling mechanisms for the above features to improve latency and efficiency with more usage of dynamic control signaling (as opposed to RRC).

For inter-cell beam management, in some cases a UE can transmit to or receive from only a single cell (i.e., the serving cell does not change when beam selection is performed). This includes L1-only measurement/reporting (i.e., no L3 impact) and a beam indication associated with cell(s) with any Physical Cell ID(s). The beam indication may be based on a Rel-17 unified TCI framework. The same beam measurement/reporting mechanism may be reused for inter-cell mTRP. Note, however, only consider intra-distributed unit (DU) and intra-frequency cases are discussed herein. In addition, the enhancements include identification and specification of features to facilitate UL beam selection for UEs equipped with multiple panels, considering UL coverage loss mitigation due to MPE, based on an UL beam indication with the unified TCI framework for UL fast panel selection.

Further enhancements on the support for multi-TRP deployment may target both FR1 and FR2. This includes identification and specification of features to improve reliability and robustness for channels other than the PDSCH (that is, the PDCCH, PUSCH, and PUCCH) using multi-TRP and/or multi-panel, with Rel.16 reliability features as the baseline; identification and specification of QCL/TCI-related enhancements to enable inter-cell multi-TRP operations, assuming multi-DCI based multi-PDSCH reception based on a Rel-15/16 TCI framework; evaluation and specification of beam-management-related enhancements for simultaneous multi-TRP transmission with multi-panel reception; and enhancement to support Single Frequency Network-High Speed Train (HST-SFN) deployment scenarios. For HST-SFN deployment scenarios, identification and specification of solution(s) on a QCL assumption for DMRS, e.g., multiple QCL assumptions for the same DMRS port(s), targeting DL-only transmission; and evaluation and, if the benefit over Rel. 16 HST enhancement baseline is demonstrated, specification of a QCL/QCL-like relation (including applicable type(s) and the associated requirement) between DL and UL signals by reusing the unified TCI framework.

For inter-cell beam management, it is desirable to provide MAC (if any) and RRC enhancements (including signaling, measurement configuration, and TCI state switching) assuming no impact to the serving cell (i.e., the serving cell does not change when beam selection is performed). Signaling between the central unit (CU) and DU may be specified to enable inter-cell beam management if any, as may the core requirements associated with the items specified by RAN1, at least including [RAN4] UE requirements for inter-cell beam management.

Most changes are related to inter-cell beam management. In particular, for L1/L2 centric mobility, the serving cell does not change when beam selection is performed. For inter-cell beam management, a UE can transmit to or receive from only a single cell. Intra-DU and intra-frequency cases only are considered. The UE requirement for inter-cell beam management is to be specified. Thus, these conditions are taken into account when determining inter-cell beam management.

For inter-cell beam management, the RRM requirements are defined if the UE only measures a single L1-RSRP from one cell. There is no requirement if the UE receives multiple L1-RSRP simultaneously. For inter-cell beam management, RAN4 only defines intra-frequency-related requirements.

RAN1 agreed that Rel.15 L1-RSRP is used as reporting quantity for measurement and reporting of non-serving-cell(s) for L1/L2-centric inter-cell mobility, here, SSB-based L1-RSRP related requirements are discussed initially.

The requirements based on L1-RSRP may depend on whether the L1-RSRP measurement is within the SMTC window.

If L1-RSRP is within the SMTC, a side condition is that an SNR=−6 dB for neighbor cell measurement can be used. A Measurement period may be dependent on the frequency range. For FR2, since different Rx beams are used for the L1 and L3 measurements, a sharing factor is introduced. The measurement period is extended by the sharing factor for the following two scenarios: P is $P_{sharing\ factor}$, when the SSB is not overlapped with the measurement gap and the SSB is fully overlapped with the SMTC period ($T_{SSB}=T_{SMTCperiod}$). P is $$\frac{P_{sharing\ factor}}{1-\frac{T_{SSB}}{MRGP}},$$

when the SSB is partially overlapped with the measurement gap and the SSB is fully overlapped with an SMTC occasion ($T_{SSB}=T_{SMTCperiod}$) and the SMTC occasion is partially overlapped with the measurement gap ($T_{SMTCperiod}$<Measurement Gap Repetition Period (MGRP)).

Measurement restriction: the UE only receives one non-serving L1-RSRP at one time. Therefore, there will be no confliction between L1-RSRP measurements from multiple cells. However, there may be a conflict between inter-cell L1-RSRP measurements with other L1 measurements from the serving cell for FR2 since the RX beam is different.

For legacy requirements, when the serving cell L1 measurement conflicts with other L1 measurements, no requirements are defined. When the SSB for a non-serving L1-RSRP measurement is in the same OFDM symbol as the CSI-RS for RLM, BFD, CBD or L1-RSRP measurement of the serving cell, whether the legacy requirement can be re-used is undetermined as yet. In some cases, the serving cell L1 measurement may be prioritized. Therefore, two options for measurement restriction exist: Option 1 in which when the inter-cell L1 measurement conflicts with other serving cell L1 measurements, a sharing factor may be considered and longer delay therefore expected; and Option 2 in which when the inter-cell L1 measurement conflicts with other serving cell L1 measurements, the serving cell L1 measurement may be prioritized.

Scheduling restrictions: re-use legacy SSB based L3 measurement scheduling restrictions for intra-frequency inter-cell measurements. In cases in which the L1-RSRP measurement is outside the SMTC window: when SSB resources used for the L1-RSRP measurements of the non-serving cell is outside the SMTC window, the UE may perform additional cell identification. Therefore, additional delay may exist for inter-cell beam measurement delay.

In addition, if the L1-RSRP measurement is outside the SMTC window, no limitation may exist that is related to the time domain configuration for the L1-RSRP measurement. Therefore, any conflict between the non-serving cell L1-RSRP measurement, the measurement gap, and the serving cell L1-RSRP measurement should be considered. In some cases, the measurement delay may be further extended when an inter-cell L1-RSRP measurement conflicts with the measurement gap and the serving cell L1-RSRP measurement.

Inter-Cell Beam Measurement Related Requirements

RAN1 agreed that SSB-based L1-RSRP measurements can be used as a reporting quantity for measurement and reporting for inter-cell beam management. Thus, SSB-based L1-RSRP-related requirement will be initially discussed. One issue is the manner in which the network configures non-serving cell information used for L1 measurements, e.g., SSB location, physical cell ID (PCI).

As above, the beam measurement and reporting mechanism for inter-cell beam management and inter-cell mTRP is the same and inter-cell beam management has no L3 impact. The RAN agreements include that the Rel. 17 inter-cell beam management and inter-cell mTRP have common points, but they are not entirely the same. The common and different points are: both use the same beam measurement/reporting mechanisms but have different TCI signaling frameworks (beam indication) as the inter-cell beam management is based on the Rel. 17 unified TCI while the inter-cell mTRP is based on the Rel. 15/16 TCI framework. Inter-cell beam management assumes that the UE-dedicated channels/RSs can be switched to a TRP with a different PCI according to the DCI/MAC-CE-based unified TCI update; for inter-cell mTRP, the UE assumes mDCI-mTRPbased multi-PDSCH reception.

For SSB reception, the UE is always able to receive CD-SSB transmissions from the serving cell TRP. There is no impact on RRM measurements of serving or neighbor cells.

From the above, the beam measurement and reporting mechanism for inter-cell beam management and inter-cell mTRP are the same. The inter-cell beam indication use the Rel-17 unified TCI framework. The inter-cell beam management have no impact on RRM measurements of serving or neighbor cells.

For inter-cell beam measurement, new RRC signaling is to be designed to provide at least the PCI and SSB configuration of (non-serving cell). There is no configuration limitation about the SSB location for the L1-RSRP measurement, i.e., whether or not the SSB is inside the SMTC window.

In some cases, the SSB location for the L1-RSRP measurement and the SSB for the L3 measurement are independent, and the L3 measurement has a higher priority. Here, the L3 measurement includes both the serving cell L3 measurement and the non-serving cell L3 measurements.

Side Condition for Inter-Cell Measurement

Another issue regarding a side condition that impacts the measurement period for the non-serving cell L1-RSRP measurement.

For legacy L3 measurements, the side condition is −6 dB; for the serving cell L1-RSRP measurement, the side condition is −3 dB. The original purpose of inter-cell beam management is for L1 handover, even though handover is performed by L3. For L3 handover, the side condition is −2 dB. The L1-RSRP measurement for a non-serving cell is applied when channel quality is relative good, which is similar to that for a legacy serving cell L1-RSRP measurement or handover.

However, it is more desirable to be at least equal to or higher than −3 dB. As a measurement accuracy requirement legacy requirement already exists for the L1-RSRP measurement, for simplicity, the side condition of the legacy L1-RSRP measurement may be reused.

Measurement Period and Accuracy for Inter-Cell Measurement

The measurement period may depend on the side condition and accuracy requirement. In some cases, the intra-frequency measurement accuracy defined in the legacy serving cell L1-RSRP measurement may be reused. In this case, the measurement accuracy is defined based on a single shot estimation.

For the serving cell L1-RSRP measurement, 1 or 3 samples may be defined, depending on whether the timeRestrictionForChannelMeasurement information element (IE) is configured. The timeRestrictionForChannelMeasurement IE is configured in the CSI-ReportConfig IE that is used for the serving cell. This, however, may not be used in a non-serving cell measurement. It is also unclear whether any similar signaling is defined in inter-cell beam reporting. In this case, it may be reasonable to define the measurement period based on a single shot at a first stage. For FR2, N=8 may be re-used to find the best RX beam.

As indicated above, in cases in which the SSB location for an inter-cell L1-RSRP measurement may be configured without limitation, the measurement may collide with the SMTC window and measurement gap. Accordingly, the UE behavior regarding such a conflict is discussed if the SSB is configured with a non-serving cell L1-RSRP and L3 measurement at the same time.

For FR1, the UE can perform both measurements simultaneously outside the measurement gap.

For FR2, three options may be used:

Option 1: Only SSBs outside the SMTC window and measurement gap can be used for a non-serving cell L1-RSRP measurement. Since the RX beam for a non-serving cell L1-RSRP measurement and L3 measurement during the SMTC window may not be the same, which is similar to a legacy L1-RSRP measurement for a serving cell, the non-serving cell L1-RSRP measurement may in some cases only be shared with the RLM/BFD/L1-RSRP of the serving cell. One drawback of option 1 is that the measurement requirement of the RLM/L1-RSRP/BFD for the serving cell may be delayed.

Option 2: SSBs inside the SMTC window are to be used for a non-serving cell L1-RSRP measurement and the SSB for L1-RSRP/BFD/RLM for the serving cell may be skipped. Since no L3 measurement is impacted, in the SMTC window, the same RX beam for the L3 measurement may be re-used for a non-serving cell L1-RSRP measurement. One advantage of option 2 is that the measurement period for the L1 serving cell measurement may not be delayed. However, a non-serving cell L1-RSRP measurement may not be able to find the best RX beam, and the L1-RSRP reporting result accordingly may not be accurate.

Option 3: an SSB inside the SMTC window and outside the SMTC window are both used. During the SMTC window, while the RX beam may not be entirely accurate, the RX beam can still provide some results for RX beam sweeping for a non-serving cell L1-RSRP measurement. Subsequently, outside the SMTC window, the UE can find the best RX beam using fewer samples. Therefore, the impact to the legacy RLM/L1-RSRP/BFD serving cell measurement may be reduced. Accordingly, option 3 may be an enhancement of option 1.

In legacy requirements, as above, the P factor is used when the SSB overlaps with the SMTC window and measurement gap. The P factor can be used as the starting point. Since the non-serving cell L1-RSRP measurement can only be shared with the RLM/BFD/L1-RSRP of the serving cell, the factor P may be further scaled for all of these signals, i.e., X*P. For example, X=1.5, 2 or 3; the exact value may be determined later.

A special case is when the SMTC window and SSB for the non-serving cell L1-RSRP measurement fully overlap. In the legacy requirements, a sharing factor is introduced for the L1 serving cell measurement and L3 measurement. However, since no L3 measurement is impacted, the L3 measurement may be unable to be shared with a non-serving cell L1-RSRP measurement. The non-serving cell L1-RSRP measurement may in some cases only be performed during the SMTC window using the RX beam of the L3 measurement. As above, the performance degradation of the non-serving cell L1-RSRP measurement may be expected since no best RX beam may be found. Therefore, no requirements may be defined for this case. If a requirement is defined, a performance degradation may be expected.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B"

includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a user equipment (UE) configured for operation in a fifth-generation new radio (5G NR) network, the apparatus comprising:
- processing circuitry; and
- memory, the processing circuitry to configure the UE to:
  - identify a cell by performing a layer three (L3) measurement on a synchronization signal block (SSB) within an SSB Measurement Timing Configuration (SMTC) window of a plurality of SMTC windows,
  - the cell having a different physical cell ID (PCI) than a serving cell;
  - encode a L3 measurement report for transmission to the serving cell;
  - perform a Layer 1 Reference Signal Received Power (L1-RSRP) measurement on a configured SSB resource from the cell having the different PCI,
  - the UE configured to perform the L1-RSRP measurement if the L3 measurement report was transmitted within a predetermined period of time; and
  - encode a L1-RSRP measurement report for transmission to the serving cell,
  - wherein for operation in frequency range two (FR2), the processing circuitry is configured to determine whether to perform the L1-RSRP measurement within one of the SMTC windows of the plurality based on a sharing factor,
  - wherein the processing circuitry is to determine the sharing factor is based on an overlap between the configured SSB resource and an SMTC occasion within the one SMTC window, and
  - wherein the sharing factor is used when the configured SSB resource overlaps with the one SMTC window and a configured measurement gap.

2. An apparatus for a user equipment (UE) configured for operation in a fifth-generation new radio (5G NR) network, the apparatus comprising: processing circuitry; and memory, the processing circuitry to configure the UE to:
- identify a cell by performing a layer three (L3) measurement on a synchronization signal block (SSB) within a SSB Measurement Timing Configuration (SMTC) window of a plurality of SMTC windows, the cell having a different physical cell ID (PCI) than a serving cell;
- encode a L3 measurement report for transmission to the serving cell;
- perform a Layer 1 Reference Signal Received Power (L1-RSRP) measurement on a configured SSB resource from the cell having the different PCI, the UE configured to perform the L1-RSRP measurement if the L3 measurement report was transmitted within a predetermined period of time; and
- encode a L1-RSRP measurement report for transmission to the serving cell,
- wherein for operation in frequency range two (FR2), the processing circuitry is configured to determine whether to perform the L1-RSRP measurement within one of the SMTC windows of the plurality based on a sharing factor,
- wherein the processing circuitry is to determine the sharing factor is based on an overlap between the configured SSB resource and an SMTC occasion within the one SMTC window,
- wherein the sharing factor is used when the configured SSB resource overlaps with the one SMTC window and a measurement gap,
- wherein for a higher value of the sharing factor, the processing circuitry is to configure the UE to perform both the L1-RSRP measurement and the L3 measurement within SMTC windows.

3. The apparatus of claim 2, wherein for a lower value of the sharing factor, the processing circuitry is to configure the UE to perform the L1-RSRP measurement outside the SMTC windows.

4. An apparatus for a user equipment (UE) configured for operation in a fifth-generation new radio (5G NR) network, the apparatus comprising: processing circuitry; and memory, the processing circuitry to configure the UE to:
- identify a cell by performing a layer three (L3) measurement on a synchronization signal block (SSB) within a SSB Measurement Timing Configuration (SMTC) window of a plurality of SMTC windows, the cell having a different physical cell ID (PCI) than a serving cell;
- encode a L3 measurement report for transmission to the serving cell;
- perform a Layer 1 Reference Signal Received Power (L1-RSRP) measurement on a configured SSB resource from the cell having the different PCI, the UE configured to perform the L1-RSRP measurement if the L3 measurement report was transmitted within a predetermined period of time; and
- encode a L1-RSRP measurement report for transmission to the serving cell,
- wherein for operation in frequency range two (FR2), the processing circuitry is configured to determine whether to perform the L1-RSRP measurement within one of the SMTC windows of the plurality based on a sharing factor,
- wherein the processing circuitry is to determine the sharing factor is based on an overlap between the configured SSB resource and an SMTC occasion within the one SMTC window,
- wherein the sharing factor is used when the configured SSB resource overlaps with the one SMTC window and a measurement gap, wherein for operation in frequency range one (FR1), the processing circuitry is configured to configure the UE to perform the L1-RSRP measurement outside the SMTC windows.

5. An apparatus for a user equipment (UE) configured for operation in a fifth-generation new radio (5G NR) network, the apparatus comprising: processing circuitry; and memory, the processing circuitry to configure the UE to:

identify a cell by performing a layer three (L3) measurement on a synchronization signal block (SSB) within a SSB Measurement Timing Configuration (SMTC) window of a plurality of SMTC windows, the cell having a different physical cell ID (PCI) than a serving cell;

encode a L3 measurement report for transmission to the serving cell;

perform a Layer 1 Reference Signal Received Power (L1-RSRP) measurement on a configured SSB resource from the cell having the different PCI, the UE configured to perform the L1-RSRP measurement if the L3 measurement report was transmitted within a predetermined period of time; and encode a L1-RSRP measurement report for transmission to the serving cell, wherein for operation in frequency range two (FR2), the processing circuitry is configured to determine whether to perform the L1-RSRP measurement within one of the SMTC windows of the plurality based on a sharing factor, wherein the processing circuitry is to determine the sharing factor is based on an overlap between the configured SSB resource and an SMTC occasion within the one SMTC window, wherein the sharing factor is used when the configured SSB resource overlaps with the one SMTC window and a measurement gap, wherein for operation in FR2, the processing circuitry to configure the UE to use a receive (RX) beam sweeping factor of up to 8 for the L1-RSRP measurement.

6. The apparatus of claim 5, wherein the RX beam sweeping factor corresponds to a number of SMTC occasions within the one SMTC window.

7. An apparatus for a user equipment (UE) configured for operation in a fifth-generation new radio (5G NR) network, the apparatus comprising: processing circuitry; and memory, the processing circuitry to configure the UE to:

identify a cell by performing a layer three (L3) measurement on a synchronization signal block (SSB) within a SSB Measurement Timing Configuration (SMTC) window of a plurality of SMTC windows, the cell having a different physical cell ID (PCI) than a serving cell;

encode a L3 measurement report for transmission to the serving cell;

perform a Layer 1 Reference Signal Received Power (L1-RSRP) measurement on a configured SSB resource from the cell having the different PCI, the UE configured to perform the L1-RSRP measurement if the L3 measurement report was transmitted within a predetermined period of time; and encode a L1-RSRP measurement report for transmission to the serving cell, wherein for operation in frequency range two (FR2), the processing circuitry is configured to determine whether to perform the L1-RSRP measurement within one of the SMTC windows of the plurality based on a sharing factor, wherein the processing circuitry is to determine the sharing factor is based on an overlap between the configured SSB resource and an SMTC occasion within the one SMTC window, wherein the sharing factor is used when the configured SSB resource overlaps with the one SMTC window and a measurement gap, wherein a measurement period for the L1-RSRP measurement is based on the sharing factor.

8. The apparatus of claim 7, wherein the processing circuitry is to configure the UE to use a same RX beam for the L3 measurement and the L1-RSRP measurement when the L3 measurement and the L1-RSRP measurement are performed with SMTC windows, and wherein the processing circuitry is to configure the UE to use different RX beams for the L3 measurement and the L1-RSRP measurement when the L1-RSRP measurement is performed outside the SMTC windows.

9. An apparatus of a generation node B (gNB) configured for operation in a fifth-generation new radio (5G NR) network, the apparatus comprising:

processing circuitry; and memory, the processing circuitry to configure the gNB to:

encode a layer three (L3) measurement report that includes a L3 measurement for a cell, the L3 measurement report received from a user equipment (UE) at a serving cell, the cell having a different physical cell ID (PCI) than the serving cell, the L3 measurement performed by the UE on a synchronization signal block (SSB) within a SSB Measurement Timing Configuration (SMTC) window of a plurality of SMTC windows; and decode a Layer 1 Reference Signal Received Power (L1-RSRP) measurement report received from the UE at the serving cell, the L1-RSRP) measurement report including a L1-RSRP measurement performed by the UE on a configured SSB resource of the cell having the different PCI, the L1-RSRP measurement performed by the UE if the L3 measurement report was transmitted within a predetermined period of time, wherein for operation in frequency range two (FR2), the L1-RSRP measurement is performed by the UE within one of the SMTC windows of the plurality based on a sharing factor, wherein the sharing factor is based on an overlap between the configured SSB resource and an SMTC occasion within the one SMTC window, wherein the sharing factor is used when the configured SSB resource overlaps with the one SMTC window and a measurement gap, and wherein a measurement period for the L1-RSRP measurement is based on the sharing factor.

* * * * *